United States Patent
Kim

(10) Patent No.: US 6,999,086 B2
(45) Date of Patent: Feb. 14, 2006

(54) VIDEO COMMUNICATION TERMINAL AND METHOD OF CONTROLLING MEMORY ACCESS IN THE SAME

(75) Inventor: Sung Deuk Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 312 days.

(21) Appl. No.: 10/117,059

(22) Filed: Apr. 8, 2002

(65) Prior Publication Data

US 2002/0145659 A1    Oct. 10, 2002

(30) Foreign Application Priority Data

Apr. 9, 2001    (KR)  ............................. 2001-18599

(51) Int. Cl.
*G06F 13/18*    (2006.01)

(52) U.S. Cl. ............... 345/535; 345/536; 345/537; 345/541; 345/542; 345/547

(58) Field of Classification Search ........ 345/533–537, 345/541–543, 546, 547, 699, 3.4, 530, 531; 348/14.01, 14.11, 211.5; 714/6; 365/230.01–230.03
See application file for complete search history.

(56) References Cited

U.S. PATENT DOCUMENTS

| | | | | |
|---|---|---|---|---|
| 5,313,624 A | * | 5/1994 | Harriman et al. | ............... 714/6 |
| 5,319,388 A | * | 6/1994 | Mattison et al. | ............ 345/558 |
| 5,392,252 A | * | 2/1995 | Rimpo et al. | .......... 365/230.02 |
| 5,748,203 A | * | 5/1998 | Tang et al. | .................. 345/542 |
| 6,229,850 B1 | * | 5/2001 | Linzer et al. | .......... 375/240.11 |
| 6,356,945 B1 | * | 3/2002 | Shaw et al. | ................. 709/231 |

* cited by examiner

*Primary Examiner*—Matthew C. Bella
*Assistant Examiner*—Hau Nguyen
(74) *Attorney, Agent, or Firm*—Fleshner & Kim, LLP

(57) ABSTRACT

A communication method apparatus are disclosed, including a common bus; a plurality of multiplexers that communicate with the common bus; a plurality of memories, each in communication with a separate one of the plurality of multiplexers and each having a different storage capacity, that together form a hierarchical storage structure; a bus arbiter that controls access to the common bus; a first interface that communicates information with the common bus; and a second interface that communicates information with the common bus.

24 Claims, 5 Drawing Sheets

FIG. 4

| example(application) | MUX-1 (SRAM-1: 18kBytes) | MUX-2 (SRAM-2: 20kBytes) | MUX-3 (SRAM-3: 114kBytes) |
|---|---|---|---|
| example-1(no LCD app) | fixed(1) | fixed(1) | fixed(1) |
| example-2(SQCIF app) | controlled(0.1) | fixed(1) | fixed(1) |
| example-3(QCIF app) | controlled(0.1) | controlled(0.1) | fixed(1) |
| example-4(CIF app) | controlled(0.1) | controlled(0.1) | controlled(0.1) |

VIDEO COMMUNICATION TERMINAL AND METHOD OF CONTROLLING MEMORY ACCESS IN THE SAME

This application claims the benefit of Korean Application No. p2001-18599, filed on Apr. 9, 2001, which is hereby incorporated by reference.

BACKGROUND OF THE INVENTION

1. Field of the Invention

The present invention relates to a next generation video communication terminal and, more particularly, to a video communication terminal using internal hierarchical memories.

2. Background of the Related Art

In an age of multimedia, information is communicated with voice, text, diagrams, and the like centering around video. As a result, the size of the communicated information becomes enormous, thereby making it difficult to store in a storage media of limited capacity and transmit through a transport channel having a small capacity.

In order to process such multimedia information effectively, compression of the information is absolutely essential. Therefore, various video compression standards have developed.

ITU-T H.261 Recommendation defines a discrete cosine transform (DCT) based compression algorithm for encoding and decoding video in real-time. H.261 discusses two types of video formats, common intermediate format (CIF) and quarter-CIF (QCIF), as shown in FIG. 1.

The formats differ only in their respective picture resolution. CIF consists of 352×288 pixels and QCIF has a quarter of the CIF resolution, 176×144 pixels. Since QCIF is a quarter of CIF's resolution, four QCIF pictures as needed to construct one CIF picture.

To overcome the limitation of H.261, H.263 is recommended. H.263 is designed for a wide range of bit rates (i.e., 10 Kb/s~2 Mb/s).

H.263 Recommendation supports five different picture resolutions. In addition to CIF and QCIF, which are also supported by H.261, there are sub-QCIF (SQCIF), four times CIF (4CIF), and sixteen times CIF (16CIF). SQCIF has approximately one half the resolution of QCIF. And, 4CIF and 16CIF have four and sixteen times greater resolution than CIF, respectively. Support of 4CIF and 16CIF allows for encoding/decoding video in accordance with H.263, so as to compete with other higher bit-rate video coding standards, such as MPEG standards.

The motion picture expert group (MPEG) has introduced standards for coding (or compression, diversity, etc.) of audiovisual information. MPEG has set up a process to provide an efficient method of reaching adequate standards for audiovisual communications.

Specifically, the new work item known as MPEG-4 aims to provide a standard to cope with the requirements of current and future multimedia applications. The MPEG-4 standard intends to support a wide range of multimedia applications, which will surely support functionalities such as security, low delay, synchronization, interworking, and the like. Some of the functionalities have already been or are being addressed by a number of other current or emerging standards. Thus, MPEG-4 standard will use similar or improved solutions, so as to address theses functionalities.

Video communication is carried out using one of the above motion video compression standards. It is a matter of fact that a video input/output format of the common form is used between two communicating terminals for data transformation.

Specifically, a mobile communication terminal securing mobility and enabling motion video communication uses three common formats, which are shown in FIG. 1, of the five formats recommended by H.263, because a quantity of video data constructing one output screen is small in general.

FIG. 1 illustrates diagrams of standard video formats according to a related art. Each format has the illustrated structure, regardless of whether the video information is color or monochrome. Namely, each of the formats is constructed with a luminance block Y and chrominance blocks Cr and Cb. Yet, in the case of monochrome, the chrominance blocks Cr and Cb are fitted with a dummy value.

FIG. 2 illustrates a block diagram of a video output structure in a video communication terminal, according to a related art. The structure includes an external bus interface block 10a interfacing external buses to an internal bus; an internal static random access memory (SRAM) 12 connected to the internal bus, so as to store video data by a common format unit; a liquid crystal display (LCD) controller 14 reading the video data stored in the internal SRAM 12, so as to output the read video data to an LCD window, one central processing unit CPU 16, and a direct memory access (DMA) port 10b. DMA port 10b provides the LCD controller 14 access to an external memory directly. In the above construction, the external buses interfaced to the internal bus, by the external bus interface block 10a, include a synchronous dynamic random access memory (SDRAM) bus and a static memory bus.

When the video output structure outputs a substantial amount of video data to the LCD, it occupies an excessive amount of the bus bandwidth. More specifically, when video data is outputted to the LCD, the controller should read one frame of video data through the bus every 1/60 sec, thereby having a serious effect on the bus bandwidth.

Many efforts have been made to prevent the performance reduction of a system due to the excessive occupation of the bus bandwidth. One result of these efforts is the system bus structure shown in FIG. 2. The video output process in a video communication terminal is explained by referring to FIG. 2, as follows.

The external bus interface block 10a interfaces the video data, which is transmitted from another terminal, to the internal bus. Additionally, it interfaces video data, which is outputted through the internal bus, to the external bus. The video data is one of the formats shown in FIG. 1.

The inputted video data are then communicated through the internal bus and stored in the internal SRAM 12. SRAM 12 has a storage capacity of 152 kbytes. SRAM 12 is installed internally because an internal memory is more advantageous than an external memory, with regard to the bus bandwidth.

LCD controller 14 reads the video data stored in the internal SDRAM 12 every 1/60 sec, through the internal bus, and then outputs the video data to the LCD. If an external memory is required for extra communication, LCD controller 14 brings the data stored in the external memory through DMA port 10b. This reduces the load of the bus bandwidth as the video data is outputted to the LCD.

For motion video transmission, the memory size requirement is changed. For example, a QCIF video transmission needs approximately twice the memory capacity as does a SQCIF video transmission, and a CIF video transmission needs about 4 times more memory capacity than does a QCIF video transmission.

A size of the video format to be communicated can be established at call set-up by both terminals communicating the data. Yet, after a call has been set up for video communication, the size of the format to be communicated is determined through negotiation, in accordance with the receiving terminal's performance.

For instance, if a first terminal can process CIF and a second terminal can process QCIF at best, the video communication between the terminals is processed using QCIF. In this case, the first terminal should use the internal memory, which has a storage capacity sufficient for storing the CIF format, despite the fact that the communication will use the QCIF format, which uses less data. Thereby, some of the internal memory space is unused.

Preferably, the structure of FIG. 2 should enable the first and second terminals to handle the same video format, thereby optimizing system efficiency.

Also, if internal SRAM 12 in one terminal has adequate memory to support a CIF video transmission but a second terminal only supports the QCIF video transmission, both terminals communicate using the QCIF video transmission. In such a case, LCD controller 14 only reads the memory area where the QCIF data is stored. During this read operation, LCD controller 14 occupies the access to internal SRAM 12. Therefore, access to internal SRAM 12 cannot be given to other processing units, such as CPU 16 and the like, at all.

In other words, the related art structure using one internal SRAM, having a fixed storage capacity, is sub-optimally efficient, considering the current video communication carried out through various formats.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, an object of the present invention is to provide a video communication terminal and method of controlling memory access.

Another object of the present invention is to provide a video communication terminal having storage flexibility.

Another object of the present invention is to provide a video communication terminal using hierarchical memories.

Another object of the present invention is to provide a video communication terminal to cope with video data transmitted through various formats.

Another object of the present invention is to effectively control internal memory access inside a terminal.

Another object of the present invention is to support video communication carried out through various video formats such as CIF, QCIF, SQCIF, or the like.

To achieve these objects and other advantages and in accordance with the purpose of the invention, as embodied and broadly described herein, a video communication terminal according to the present invention includes an internal bus, a plurality of multiplexers connected to the internal bus, a plurality of memories connected to the corresponding multiplexers and having hierarchical storage capacities respectively, and an arbiter controlling access paths to the respective memories.

In another aspect of the present invention, in a video communication terminal having a plurality of memories having hierarchical storage capacities, a method of controlling memory access in the video communication terminal includes a first step of determining a video format to be communicated through protocol negotiation and giving access paths to inner memories corresponding to a size of the determined video format, a second step of storing a received video format through the given access paths, and a third step of opening the access paths to the inner memories, in which the received video format is stored, to an LCD controller.

In a further aspect of the present invention, in a video communication terminal having static random access memories (SRAMs) designed to have a storage capacity of a standardized picture resolution common intermediate format (CIF), to which the total storage capacities of the SRAMs are added, a method of controlling access to the SRAMs includes a first step of allocating an access path to the SRAMs, in which a selected video format will be written according to selecting one of CIF, quarter CIF (QCIF), and sub-quarter CIF (SQCIF) as the video format to be communicated through protocol negotiation, and, after the video format is stored in the SRAMs, a second step of allocating an access path to an LCD controller that will read the stored video format.

The objects of the present invention may be further achieved in whole or in part by a communication apparatus, including a common bus; a plurality of multiplexers that communicate with the common bus; a plurality of memories, each in communication with a separate one of the plurality of multiplexers and each having a different storage capacity, that together form a hierarchical storage structure; a bus arbiter that controls access to the common bus; a first interface that communicates information with the common bus; and a second interface that communicates information with the common bus.

The objects of the present invention may be further achieved in whole or in part by a communication method, including selecting a first group of a plurality of memories, each having a different storage capacity, based upon the maximum number of memories that may be selected to store a particular amount of information with the least amount of unused storage capacity remaining in the selected memories after the information is stored; and communicating information, through a common bus, between a first interface and the first group of memories.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4 illustrates a table of examples for access control, in a hierarchical memory structure according to the present invention.

DETAILED DESCRIPTION OF PREFERRED EMBODIMENTS

Figure 1:
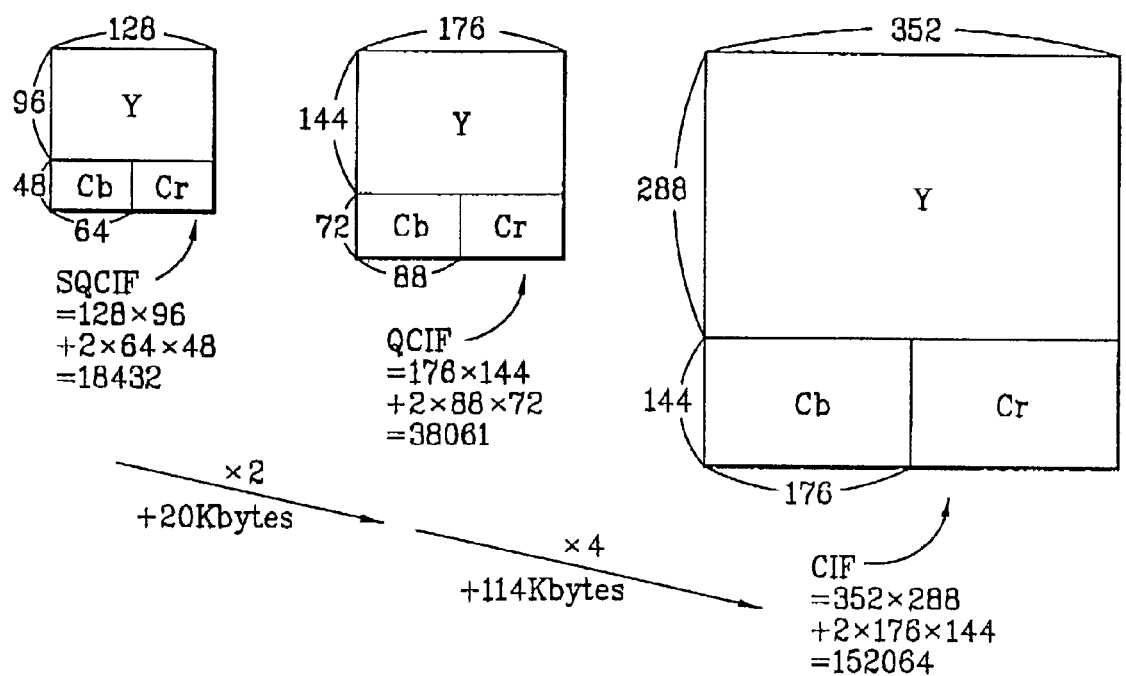
FIG. 1 illustrates diagrams of standard video formats according to a related art.
Figure 2:
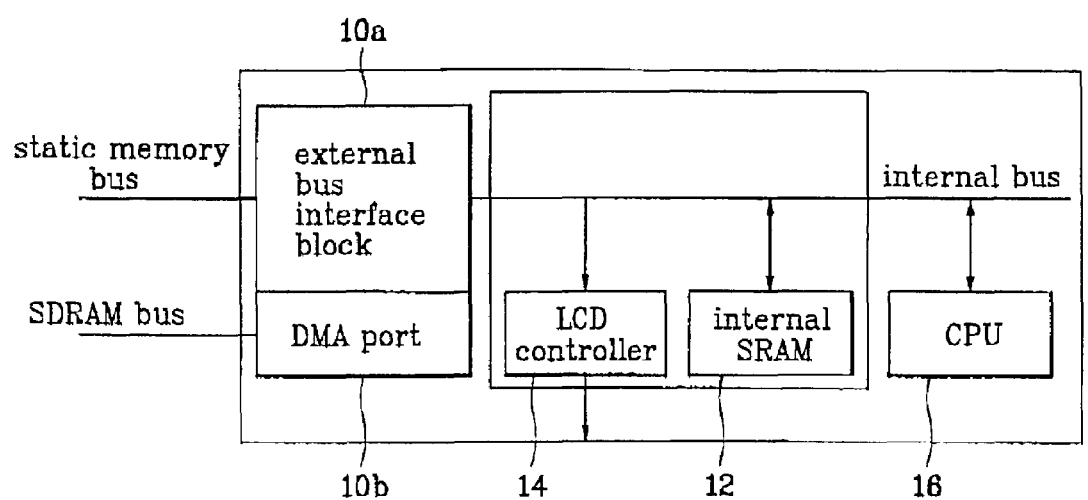
FIG. 2 illustrates a block diagram of a video output process, in a video communication terminal according to a related art.
Figure 3:
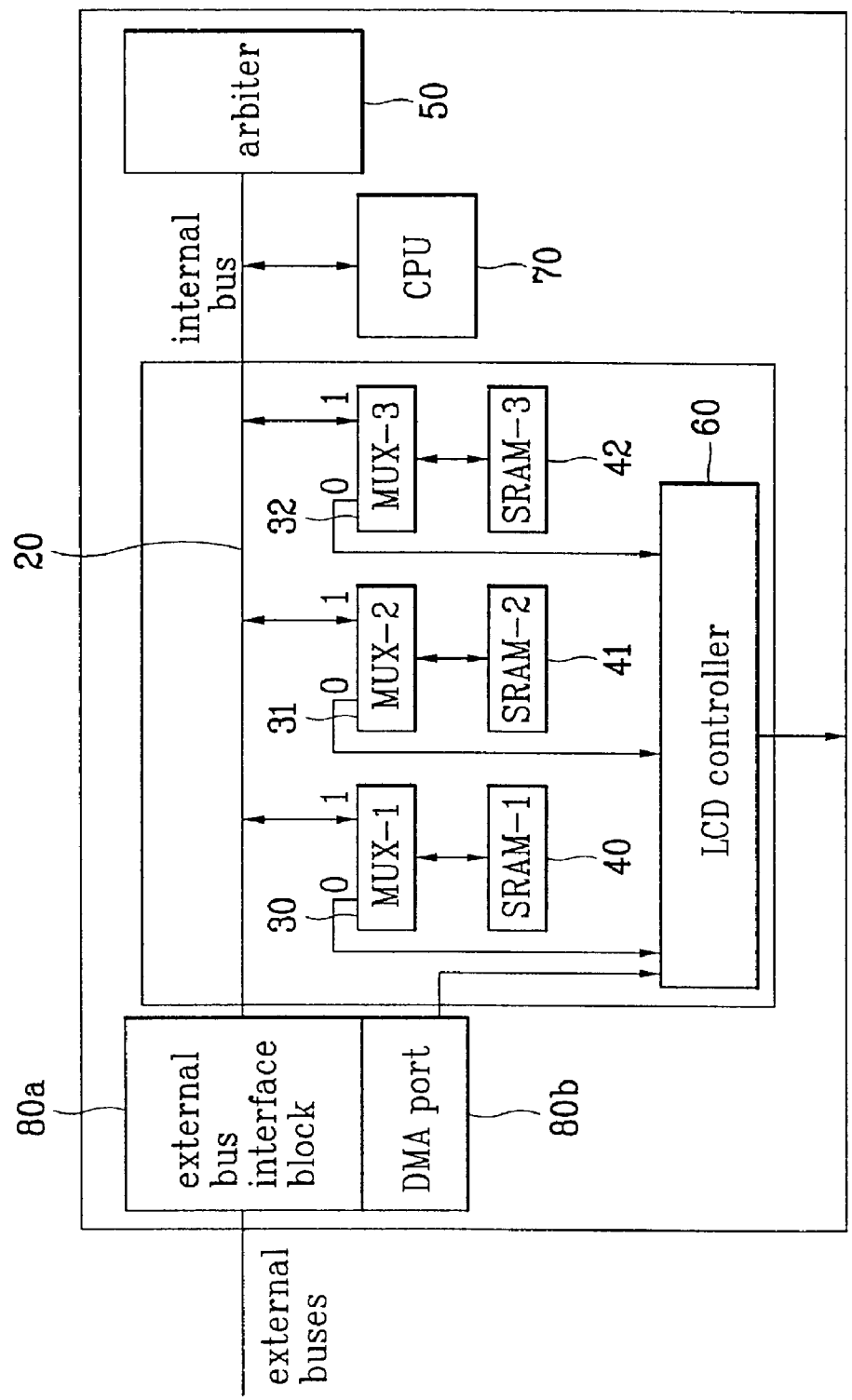
FIG. 3 illustrates a block diagram for a memory access control, in a video communication terminal according to the present invention.

FIG. 3 illustrates a motion video communication terminal, communicating video with the common formats in FIG. 1, in which a portion of a video codec is shown. An inner structure of a video communication terminal according to the present invention includes an internal bus 20, a multiplexer-1 30 connected to internal bus 20, a multiplexer-2 31 connected to internal bus 20, a multiplexer-3 32 connected to internal bus 20, an internal static random access memory-1 (SRAM-1) 40 connected to multiplexer-1 30 and having a hierarchical storage capacity, an internal SRAM-2 41 connected to multiplexer-2 31 and having a hierarchical storage capacity, an internal SRAM-3 42 connected to multiplexer-3 32 and having a hierarchical storage capacity, and an arbiter 50 controlling access paths to internal SRAMs 40, 41, and 42, respectively. A liquid crystal display (LCD) controller 60 accesses internal SRAMs 40, 41, and 42 entirely or in part, in accordance with the access path control provided by arbiter 50, so as to read a standardized video format that is currently stored. A CPU 70 receives access authority for internal SRAMs 40, 41, and 42. An external bus interface block 80a interfaces external buses to the internal bus 20. And, a direct memory access (DMA) port 80b allows LCD controller 60 to gain access to an external memory directly. In the above construction, the external buses interfaced to internal bus 20, by external bus interface block 80a, include a synchronous dynamic random access memory (SDRAM) bus and a static memory bus.

External bus interface block 80a interfaces the video data, which is transmitted from another terminal, to internal bus 20. Additionally, it communicates video data, which is outputted through internal bus 20, to the external bus. The video data is one of the video formats shown in FIG. 1.

The video data inputted through the external bus interface block 80a is stored in the internal SRAMs 40 to 42 through internal bus 20.

The internal SRAMs 40 to 42 are designed with a hierarchical structure. Preferably, internal SRAM-1 40, internal SRAM-2 41, and internal SRAM-3 42 have different capacities, such that internal SRAM-1 40<internal SRAM-2 41<internal SRAM-3 42.

Design examples of internal SRAMs 40, 41, and 42, according to the present invention, are explained in detail as follows.

[First Design Example]

Internal SRAM-1 40 is designed to have a storage capacity for a standardized picture resolution of sub-quarter common intermediate format (SQCIF). Together, internal SRAM-2 41 and internal SRAM-1 40 are designed to have a combined storage capacity for a standardized picture resolution of quarter common intermediate format (QCIF). Together, internal SRAM-1 40, internal SRAM-2 41, and internal SRAM-3 42 are designed to have a combined storage capacity for a standardized picture resolution of common intermediate format (CIF). If a count of the internal SRAMs used for the present invention is N, the sum of the internal SRAM capacities SRAM-1 through SRAM-M is equal to a storage capacity needed to store the standardized picture resolution of M−2 CIF pictures for all integer M, where 3<M≦N.

[Second Design Example]

Each of the internal SRAMs 40 to 42 is designed to have a storage capacity amounting to a picture resolution X*CIF, where X is a variable and CIF is the common intermediate format of a picture transformed from its original image. Preferably, internal SRAM-1 40 is designed to have a storage capacity of SQCIF, internal SRAM-2 41 is designed to have a storage capacity of QCIF, and internal SRAM-3 42 is designed to have a storage capacity of CIF. Preferably, if a count of the internal SRAMs used for the present invention is N, an internal SRAM-M is designed to have a storage capacity of (M−2)*CIF, for every integer value of M where 3<M≦N.

LCD controller 60 reads the video data stored in internal SRAMs 40 to 42, through the bus, every 1/60 sec, so as to output the read data to an LCD (not shown in the drawing). When the use of the external memory is required for extra communication, LCD controller 60 brings the data stored in the external memory through DMA port 80b.

Arbiter 50 controls the access paths to the respective internal SRAMs 40 to 42 so that LCD controller 60 may provide the video data stored in the internal SRAMs 40 to 42 to the LCD. Arbiter 50 also provides CPU 70 access to internal SRAMs 40 to 42.

Examples of the memory access control performed by arbiter 50 in the video communication terminal according to the present invention are explained as follows, by referring to the above-described first design example of internal SRAMs 40 to 42.

[First Example]

The video communication terminal according to the present invention communicates with a terminal supporting the video transmission of a picture having the SQCIF resolution. Arbiter 50 allocates the path of multiplexer-1 30, connected to internal SRAM-1 40, for the video communication and allocates the paths of multiplexer-2 31 and multiplexer-3 32, connected to internal SRAM-2 41 and internal SRAM-3 42, respectively, for the process of CPU 70, when the CPU 70 demands the use of internal SRAM-2 41 and internal SRAM-3 42.

If a count of the internal SRAMs used in the video communication terminal is N, paths of multiplexer-2 to multiplexer-N, connected to internal SRAM-2 to internal SRAM-N, are allocated to CPU 70, when CPU 70 requests the use of the internal memories for an output process.

Through the above first example describing the sizing of internal SRAMs 40 to 42, another case of the video communication between terminals supporting video transmissions of QCIF and SQCIF, respectively, can be understood with ease, whereby much of the corresponding explanation is skipped.

[Second Example]

The video communication terminal according to the present invention communicates with a terminal supporting the QCIF video transmission. Arbiter 50 allocates the paths of multiplexer-1 30 and multiplexer-2 31, connected to internal SRAM-1 40 and internal SRAM-2 41, respectively, for the video communication. Arbiter 50 allocates the path of multiplexer-3 32, connected to internal SRAM-3 42, for the process of CPU 70, when CPU 70 request the use of internal SRAM-3 42. If a count of the internal SRAMs used in the video communication terminal is N, paths of multiplexer-3 to multiplexer-N, connected to internal SRAM-3 to internal SRAM-N, are allocated to CPU 70, when CPU 70 requests the use of the internal memories for an output process.

Through the above first example, another case of the video communication between terminals, supporting video transmissions of CIF, is explained below. If a count of the internal SRAMs used in the video communication terminal is N, arbiter 50 allocates the paths of multiplexer-1 30 to multiplexer-3 32, connected to internal SRAM-1 40 to internal SRAM-3 42, respectively, for the video communication. Arbiter 50 allocates the rest of the multiplexer paths, connected to the rest of the internal SRAMs, for CPU 70, when CPU 70 requests the use of the internal memories for an output process.

Explained below is a procedure of controlling memory access in the course of communicating with another terminal, using the video communication terminal according to the present invention.

Figure 5:
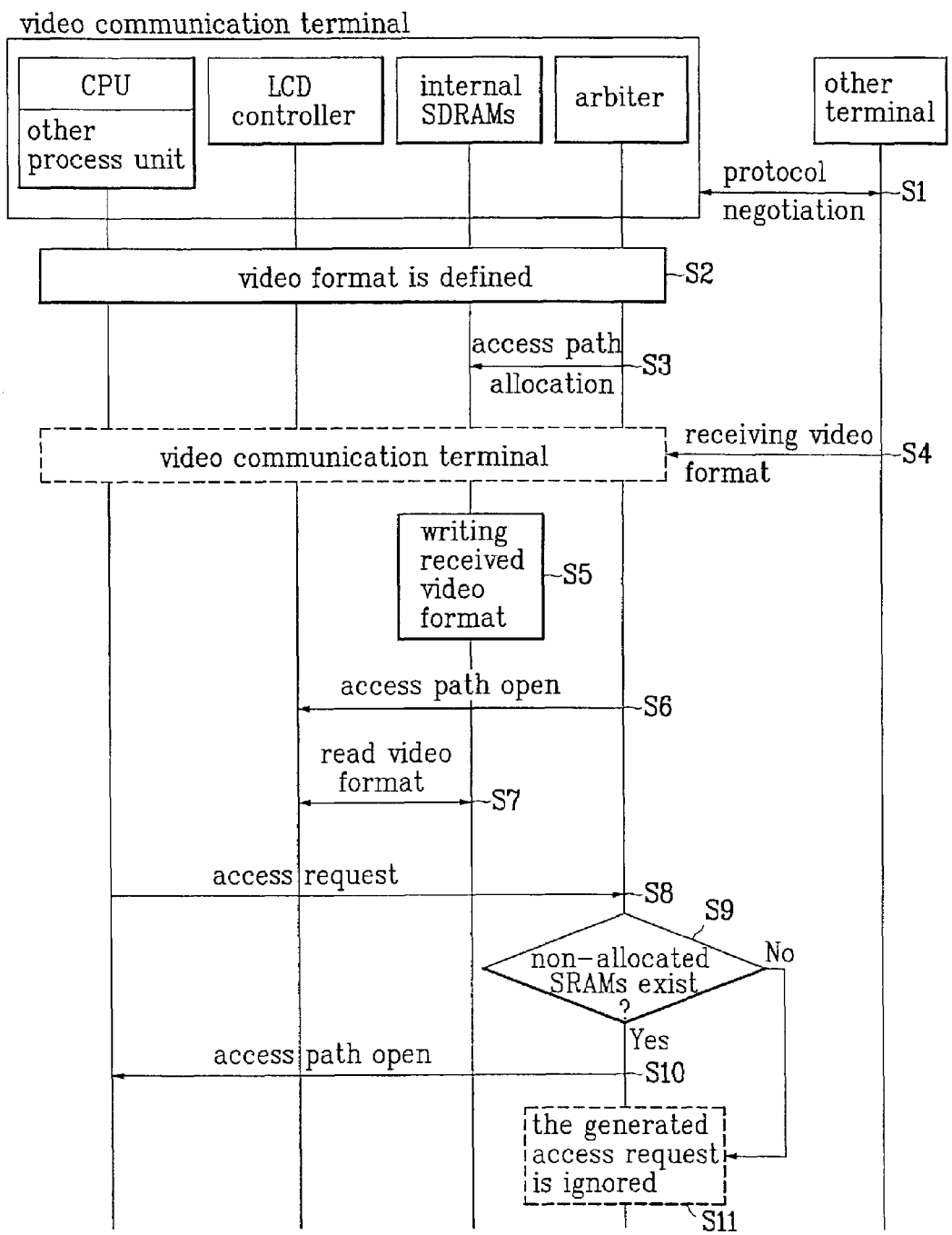
FIG. 5 illustrates a flowchart for a method of controlling memory access in a video communication terminal.

FIG. 5 illustrates a flowchart for a method of controlling memory access in a video communication terminal. A video communication terminal according to the present invention and the other terminal determine, together, a video format to communicate through protocol negotiation (S1, S2). The video communication terminal according to the present invention tries to determine the video format the other terminal can process.

Arbiter 50 allocates access paths to the internal SRAMs corresponding to the size of the determined video format (S3). For example, if the video format the other terminal can process is SQCIF, the access path is allocated to internal SRAM-1, which has just enough memory to store a SQCIF picture. If the video format the other terminal can process is QCIF, arbiter 50 allocates access paths to internal SRAM-1 40 and internal SRAM-2 41, concurrently. Further, if the video format the other terminal can process is CIF, the access paths are allocated to internal SRAM-1 40, internal SRAM-2 41, and internal SRAM-3 42, concurrently.

If a predetermined video format is received from the other terminal (S4), the received video format is written through the allocated path(s) (S5). Thereafter, an access path to the internal SRAMs, in which the received video format is written, is closed to internal bus 20 and opened to LCD controller (S6). LCD controller 60 then reads the received video format from the internal SRAMs (S7).

If an access request for the internal SRAMs is generated from CPU 70 (S8), arbiter 50 checks whether any spare internal SRAMs exist, or not, and then allocates an access path to the spare internal SRAM(s) for CPU 70 (S9, S10). A spare internal SRAM is one that is not being accessed currently by internal bus 20 or LCD controller 60. If no spare internal SRAM is available, the access request generated by CPU 70 is ignored (S11).

Preferably, when the video format the other terminal can process is SQCIF and internal bus 20 or LCD controller 60 has gained access to the corresponding internal SRAM-1 40, arbiter 50 opens the access paths to internal SRAM-2 41 and internal SRAM-3 42 for CPU 70, if an access request for the internal SRAMs is generated from CPU 70.

When the video format the other terminal can process is QCIF and internal bus 20 or LCD controller 60 has gained access to the corresponding internal SRAM-1 40 and internal SRAM-2 41, arbiter 50 opens the access path to internal SRAM-3 42 for CPU 70, if the access request for the internal SRAMs is generated from CPU 70.

FIG. 4 illustrates a table of examples for access control in a hierarchical memory structure, according to the present invention and the above-described first design example of the internal SRAMs 40 to 42.

Referring to FIG. 4, example-1 is a case that the terminal has no input/output. In this case, paths of all internal SRAMs 40–42 are fixed to internal bus 20, so as to be excluded from the influence of LCD controller 60. Preferably, arbiter 50 sets the path control values for all multiplexers to a value of '1' so that multiplexers 30-32 communicate with internal bus 20 and not LCD controller 60.

Example-2 is a case where the video communication terminal, according to the present invention, communicates with the terminal supporting the SQCIF video transmission. Internal SRAM-1 40 is used for the LCD output memory and paths of internal SRAM-2 41 and internal SRAM-3 42 are fixed to internal bus 20 only. Preferably, arbiter 50 controls the 'on/off' value of multiplexer-1 30 in accordance with the video input/output and control path values of multiplexer-2 31 and multiplexer-3 32 to have values '1' so that these multiplexers communicate with internal bus 20. Preferably, the path value of multiplexer-1 30 to internal bus 20 is '1' when the SQCIF video data is written in internal SRAM-1 40, and the path value of multiplexer-1 30 to internal bus 20 is '0' when LCD controller 60 reads the SQCIF video data from internal SRAM-1 40.

Example-3 is a case where the video communication terminal, according to the present invention, communicates with a terminal supporting the QCIF video transmission. Internal SRAM-1 40 and internal SRAM-2 41 are used for the LCD output memories and the path of internal SRAM-3 42 is designated (fixed) for use by internal bus 20 only. Preferably, arbiter 50 controls the 'on/off' path access of multiplexer-1 30 and multiplexer-2 31 in accordance with the video input/output. A path value of multiplexer-3 32 to internal bus 20 is set to '1'. Preferably, the respective path values of multiplexer-1 30 and multiplexer-2 31 to the internal bus 20 are '1', when the QCIF video data are written in internal SRAM-1 40 and internal SRAM-2 41. The respective path values of multiplexer-1 30 and multiplexer-2 31 to internal bus 20 are '0' when LCD controller 60 reads the QCIF video data from internal SRAM-1 40 and internal SRAM-2 41.

Example-4 is a case where the video communication terminal, according to the present invention, communicates with a terminal supporting the CIF video transmission. Here, all of internal SRAM-1 40 through internal SRAM-3 42 are used for the LCD output memories. Preferably, arbiter 50 controls the 'on/off' path access of multiplexer-1 30 to multiplexer-3 32 in accordance with the video input/output. Preferably, the respective path values of multiplexer-1 30 to multiplexer-3 32 to internal bus 20 are '1', when the CIF video data are written in internal SRAM-1 40 to internal SRAM-3 42. The respective path values of multiplexer-1 30 to multiplexer-3 32 to internal bus 20 ate '0' when LCD controller 60 reads the CIF video data from internal SRAM-1 40 to internal SRAM-3 42.

In the above-explained examples, illustrated by FIG. 4, when the path of the internal SRAM is fixed to internal bus 20 only, other components inside the terminal such as CPU 70 and the like may use the internal SRAM. Thus, LCD controller 60 and CPU 70 can use separate internal SRAMs in parallel, when the video communication terminal according to the present invention communicates with terminals.

Accordingly, the video communication terminal and method of controlling memory access, in the same, has the following advantages or effects.

The terminal according to the present invention is realized by the hierarchical memory structure, thereby enabling it to provide flexibility in the use of internal memories even if the video data are transmitted using various formats.

Moreover, the present invention controls the access to the internal memories, generated inside the terminal, effectively, thereby enabling it to maximize an efficiency of the internal SRAMs, even when communicating with various video formats such as CIF, QCIF, SQCIF or the like.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A video communication terminal, comprising:
    an internal bus;
    a plurality of multiplexers connected to the internal bus;
    a plurality of memories, each connected to a corresponding one of the plurality of multiplexers, having hierarchical storage capacities, respectively; and
    an arbiter controlling access paths to the respective memories, wherein
    a first memory of the plurality of memories has a storage capacity for a standardized picture resolution of sub-quarter common intermediate format (SQCIF);
    a second memory of the plurality of memories together with the first memory have a combined storage capacity for a standardized picture resolution of quarter common intermediate format (QCIF); and
    a third memory of the plurality of memories together with the first memory and the second memory have a combined storage capacity for a standardized picture resolution of common intermediate format (CIF).

2. The video communication terminal of claim 1, further comprising:
    a liquid crystal display (LCD) controller that accesses the memories, in accordance with states of the access paths controlled by the arbiter; and
    a control processing unit (CPU) that simultaneously accesses a memory that is not currently accessed by the LCD controller, wherein all of the memories are accessible to each of said CPU and LCD controller.

3. The video communication terminal of claim 2, wherein the arbiter allocates an access path to the CPU when the memory that is not accessed by the LCD controller is available.

4. The video communication terminal of claim 2, wherein the LCD controller is connected to a direct memory access (DMA) port so as to gain access to an extra external memory.

5. The video communication terminal of claim 2, wherein said arbiter is configured to control access paths so the LCD controller reads data from a first memory while the CPU simultaneously writes data to a second memory.

6. The video communication terminal of claim 1, wherein an $M^{th}$ memory of the plurality of memories, if a count of the memories is N>3, together with the first through $M-1^{th}$ memories have a combined storage capacity for a standardized picture resolution of M-2 CIF pictures, for all integer values of M where $3 > M \geq N$.

7. The video communication terminal of claim 6, wherein when the video communication terminal communicates the SQCIF picture resolution with an external terminal, the arbiter allocates a path of the multiplexer connected to the first memory to the video communication and paths of the multiplexers connected to the second through $N^{th}$ memories to another inner process.

8. The video communication terminal of claim 6, wherein when the video communication terminal communicates the QCIF picture resolution with an external terminal, the arbiter allocates paths of the multiplexers connected to the first and second memories, respectively, to the video communication and paths of the multiplexers connected to the third through $N^{th}$ memories to another inner process.

9. The video communication terminal of claim 6, wherein when the video communication terminal communicates the CIF picture resolution with an external terminal, the arbiter allocates paths of the multiplexers connected to the first through third memories, respectively, to the video communication and paths of the multiplexers connected to the fourth through $N^{th}$ memories to another inner process.

10. The video communication terminal of claim 1, wherein said hierarchical storage capacities comprises a first memory connected only to a first multiplexer and a second memory connected only to a second multiplexer, wherein the first and second memories are each different sizes, wherein the terminal is a mobile communication terminal.

11. A communication apparatus, comprising:
    a common bus;
    a plurality of multiplexers that communicate with the common bus;
    a plurality of memories, each in communication with a separate one of the plurality of multiplexers and wherein a first memory is connected to a first multiplexer, and a second memory is connected to a second multiplexer, wherein the first and second memories each are different sizes that together form a hierarchical storage structure;
    a bus arbiter that controls access to the common bus; and
    a first interface that communicates information with the common bus, wherein first through third memories of the plurality of memories each has a storage capacity for a standardized picture resolution of X*CIF, where X is a variable and CIF is a common intermediate format.

12. The communication apparatus of claim 11, wherein
    a first memory of the plurality of memories has a storage capacity of a standardized picture resolution for a sub-quarter common intermediate format (SQCIF);
    a second memory, of the plurality of memories, together with the first memory have a combined storage capacity of a standardized picture resolution for a quarter common intermediate format (QCIF); and
    a third memory, of the plurality of memories together with the first memory and the second memory have a combined storage capacity of a standardized picture resolution for a common intermediate format (CIF).

13. The video communication terminal of claim 12, wherein each $M^{th}$ of N memories, for N>3, is designed to have a storage capacity amounting to a CIF picture resolution multiplied by (M−2) for integer values of M given by $3 < M \leq N$.

14. The apparatus of claim 11, further comprising:
    a second interface that communicates information with the common bus, wherein
    the bus arbiter separately controls each multiplexer's ability to communicate with the common bus, and
    the bus arbiter controls a first group of the plurality of multiplexers to communicate with the first interface, through the common bus, while simultaneously controlling a second group of the plurality of multiplexers to communicate with the second interface, through the common bus or an alternative bus.

15. The apparatus of claim 11, further comprising:
a second interface that communicates information with the common bus, wherein
the bus arbiter separately controls each multiplexer's ability to communicate with the common bus,
the bus arbiter controls a first group of the plurality of multiplexers to communicate with the first interface, through the common bus, and
the individual multiplexers forming the first group are selected based upon the maximum number of corresponding memories that may be selected to store a particular amount of information, with the least amount of unused storage capacity remaining in the selected memories after the information is stored, wherein:
the bus arbiter controls a second group of the plurality of multiplexers to concurrently communicate with the second interface, through the common bus or an alternative bus, while the first group of multiplexers communicate with the first interface, through the common bus, wherein the video communication device is a mobile communication terminal.

16. The apparatus of claim 11, wherein each $M^{th}$ of N memories, for N>3, is designed to have a storage capacity amounting to a CIF picture resolution multiplied by (M−2) for integer values of M given by $3<M\leq N$.

17. The apparatus of claim 11, wherein said arbiter is configured to control access paths so the first multiplexer reads data from said first memory while the second multiplexer simultaneously writes data to said second memory.

18. A video communication terminal, comprising:
an internal bus;
a plurality of multiplexers connected to the internal bus;
a plurality of memories, each connected to a corresponding one of the plurality of multiplexers, having hierarchical storage capacities, respectively;
an arbiter controlling access paths to the respective memories;
a liquid crystal display (LCD) controller that accesses the memories, in accordance with states of the access paths controlled by the arbiter; and
a control processing unit (CPU) that simultaneously accesses a memory that is not currently accessed by the LCD controller, wherein each of the memories are accessible to each of said CPU and LCD controller.

19. The video communication terminal according to claim 18, wherein said arbiter is configured to control access paths so a first multiplexer reads data from a first memory while a second multiplexer simultaneously writes data to a second memory.

20. The video communication terminal of claim 18, wherein first through third memories each has a storage capacity for a standardized picture resolution of X*CIF, where X is a variable and CIF is a common intermediate format.

21. A video communication terminal, comprising:
an internal bus;
a plurality of multiplexers connected to the internal bus;
a plurality of memories, each connected to a corresponding one of the plurality of multiplexers, having hierarchical storage capacities, respectively; and
an arbiter controlling access paths to the respective memories, wherein at least one memory and its said corresponding multiplexer are connected to each other, and wherein said arbiter is configured to control access paths so a first multiplexer reads data from a first memory while a second multiplexer simultaneously writes data to a second memory, wherein:
a first memory of the plurality of memories has a storage capacity of a standardized picture resolution for a first format;
a second memory, of the plurality of memories, together with the first memory have a combined storage capacity of a standardized picture resolution for a second format; and
a third memory, of the plurality of memories together with the first memory and the second memory have a combined storage capacity of a standardized picture resolution for third format.

22. The video communication terminal of claim 21, wherein first through third memories each has a storage capacity for a standardized picture resolution of X*CIF, where X is a variable and CIF is a common intermediate format.

23. The video communication terminal of claim 21, a first memory of the plurality of memories has a storage capacity for a standardized picture resolution of sub-quarter common intermediate format (SQCIF);
a second memory of the plurality of memories together with the first memory have a combined storage capacity for a standardized picture resolution of quarter common intermediate format (QCIF); and
a third memory of the plurality of memories together with the first memory and the second memory have a combined storage capacity for a standardized picture resolution of common intermediate format (CIF).

24. A video communication terminal, comprising:
an internal bus;
a plurality of multiplexer means for connecting to the internal bus;
a plurality of storage means, each for connecting to a corresponding one of the plurality of multiplexer means, wherein the plurality of storage means have hierarchical storage capacities, respectively;
arbiter means for controlling access paths to the respective storage means, wherein at least one storage means and its said corresponding multiplexer means are connected only to each other;
a liquid crystal display (LCD) controller that accesses the memories, in accordance with states of the access paths controlled by the arbiter means; and
a control processing unit (CPU) that simultaneously accesses a memory that is not currently accessed by the LCD controller. wherein each of the memories are accessible to each of said CPU and LCD controller. wherein first through third storage means each has a different storage capacity for a standardized picture resolution of X*CIF, where X is a variable and CIF is a common intermediate format.

* * * * *